United States Patent [19]

Hidaka

[11] Patent Number: 4,949,100

[45] Date of Patent: Aug. 14, 1990

[54] APPARATUS FOR FORMING COMPOSITE LASER BEAM

[75] Inventor: Shinobu Hidaka, Osaka, Japan

[73] Assignee: Minolta Camera Kabushiki Kaisha, Osaka, Japan

[21] Appl. No.: 302,831

[22] Filed: Jan. 26, 1989

[30] Foreign Application Priority Data

Jan. 28, 1988 [JP] Japan .................................. 63-18670

[51] Int. Cl.$^5$ ........................................... G01D 15/14
[52] U.S. Cl. .................................. 346/108; 346/160; 369/44.11
[58] Field of Search .................. 346/108, 107 R, 76 L, 346/160; 369/44

[56] References Cited

U.S. PATENT DOCUMENTS 4,367,912 1/1983 Kitamura .
4,571,712 2/1986 Romano ................................. 369/44
4,841,137 6/1989 Mochizuki et al. .................. 346/108

FOREIGN PATENT DOCUMENTS

60-32019 2/1985 Japan .
60-201319 10/1985 Japan .

Primary Examiner—Mark J. Reinhart
Attorney, Agent, or Firm—Price, Gess & Ubell

[57] ABSTRACT

An apparatus for forming a composite laser beam for use in an image forming apparatus forming an image with the use of a composite beam formed of a plurality of laser beams having wavelengths different from one another. Laser beams having different wavelengths with one another radiated from a plurality of laser beam oscillators are combined by a beam combining apparatus made up of an optical system. The beams thus combined are detected for discrepancy between positions of the beams by a beam position detecting sensor, and thereby, the positions of beam oscillators are adjusted so that the deviation of the beam radiated thereby from the other beam, taken as the reference beam, may become zero. Thus a plurality of beams can be formed into a composite beam.

14 Claims, 6 Drawing Sheets

APPARATUS FOR FORMING COMPOSITE LASER BEAM

BACKGROUND OF THE INVENTION

1. Field of the Invention

The present invention relates to an apparatus for aligning laser beams and more particularly to an apparatus for forming a composite laser beam for use in an image forming apparatus having a scanning means scanning a photosensitive member with the composite beam obtained by combining laser beams from a plurality of laser oscillators and capable of accurately aligning all the laser beams with a reference axis.

2. Description of the Prior Art

Figure 8:
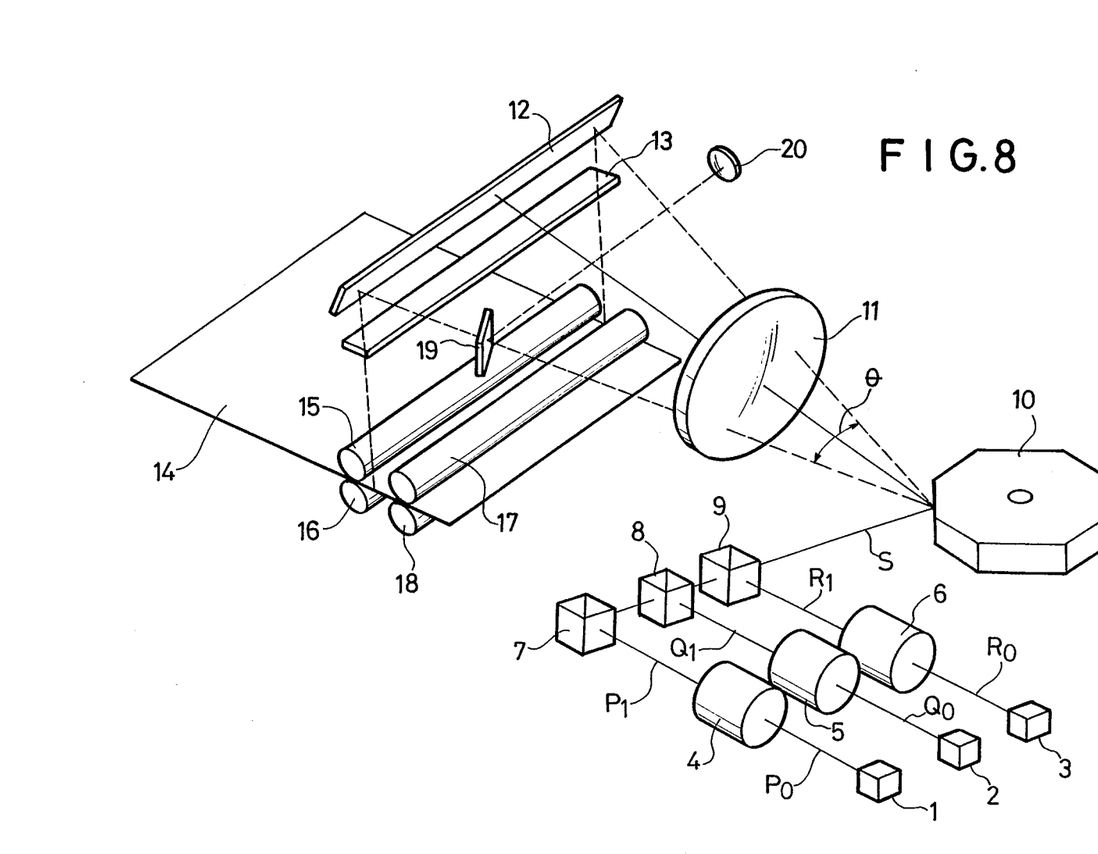
FIG. 8 is a schematic arrangement diagram showing an example of optical systems of prior art laser beam printers.

There has so far been known laser printers having a scanning means scanning a photosensitive recording member with a composite beam thereby forming a color image. In such laser printers, the optical system has, for example, an arrangement as shown in FIG. 8.

In the optical system, there are provided three, first to third, semiconductor laser oscillators 1, 2, and 3, having different oscillating wavelengths from one another and it is adapted such that laser beams from these oscillators form, on photosensitive recording paper 14, an image of three primary colors (yellow, megenta, and cyan) corresponding to the additive primary colors.

First to third laser beams $P_0$, $Q_0$, $R_0$ with a divergent angle radiated from the first to third laser oscillators 1, 2, 3, respectively, are adapted to be turned into first to third parallel beams $P_1$, $Q_1$, $R_1$, respectively, by means of collimator lenses 4, 5, 6 located ahead.

Further ahead of the first laser oscillator 1, there is disposed a reflecting prism 7 with a reflection angle of 90°, of the second laser oscillator 2, there is disposed a combining dichroic prism 8 for reflecting the second parallel beam $Q_1$ at an angle of 90° and transmitting the first parallel beam $P_1$ reflected from the reflecting prism 7 thereby combining these beams, and of the third laser oscillator 3, there is disposed a combining dichroic prism 9 for reflecting the third parallel beam $R_1$ at an angle of 90° and transmitting the combined beam of the first and second parallel beams $P_1$, $Q_1$ by means of the reflecting prism 7 and the combining dichroic prism 8 thereby combining these beams.

Thus, these parallel beams $P_1$, $Q_1$, $R_1$ are combined into a composite beam S by means of the reflecting prism 7 and the combining dichroic prisms 8, 9.

The thus formed composite beam S is horizontally deflected through an angle of scan $\theta$ by means of a polygon mirror 10.

The composite beam S is passed through a lens 11 and reflected downward by a reflecting mirror 12 so as to irradiate, through a window glass 13, the photosensitive recording paper 14 as a member to be irradiated.

Reference numerals 15, 16 and reference numerals 17, 18 each denote rollers for transporting the photosensitive recording paper 14 and reference numeral 19 denotes a mirror for leading a beam to a sensor 20 for detecting the scan starting position of the scanning beam S.

With such an image forming apparatus, it is usual that there occur variations in characteristic and in position of various optical members with the lapse of time and changes in temperature, and in such an event, the composite beam becomes such that is not any more an accurately aligned beam of a plurality of laser beams. Thus, discrepancy between the irradiated points by the beams causes nonregistration of colors.

Therefore, it becomes necessary to accurately align the plurality of laser beams again. The realignment requires equipment for optical axis adjustment and expensive instruments other than the image forming apparatus, and further it requires high skill, and therefore it has been impossible for an ordinary user to perform the alignment.

SUMMARY OF THE INVENTION

A primary object of the present invention is to provide an apparatus for forming a composite laser beam capable of obtaining the composite beam in which laser beams radiated from a plurality of laser oscillators are accurately aligned.

Another object of the present invention is to provide an apparatus for forming a composite laser beam capable, in the event, while in use in an image forming apparatus, of any occurrence of nonalignment of the component laser beams by some reason or other, of automatically correcting the nonalignment.

Other objects of the present invention will become apparent from the following detailed description with reference to the accompanying drawings.

DETAILED DESCRIPTION OF THE PREFERRED EMBODIMENTS

Preferred embodiments of the present invention will be described below in detail with reference to FIG. 1 to FIG. 7.

To begin with, a first embodiment will be described using FIG. 1 to FIG. 5. This embodiment is such that it uses a composite laser beam forming apparatus, according to the present invention, to a laser printer having a two laser beam sources.

Figure 1:
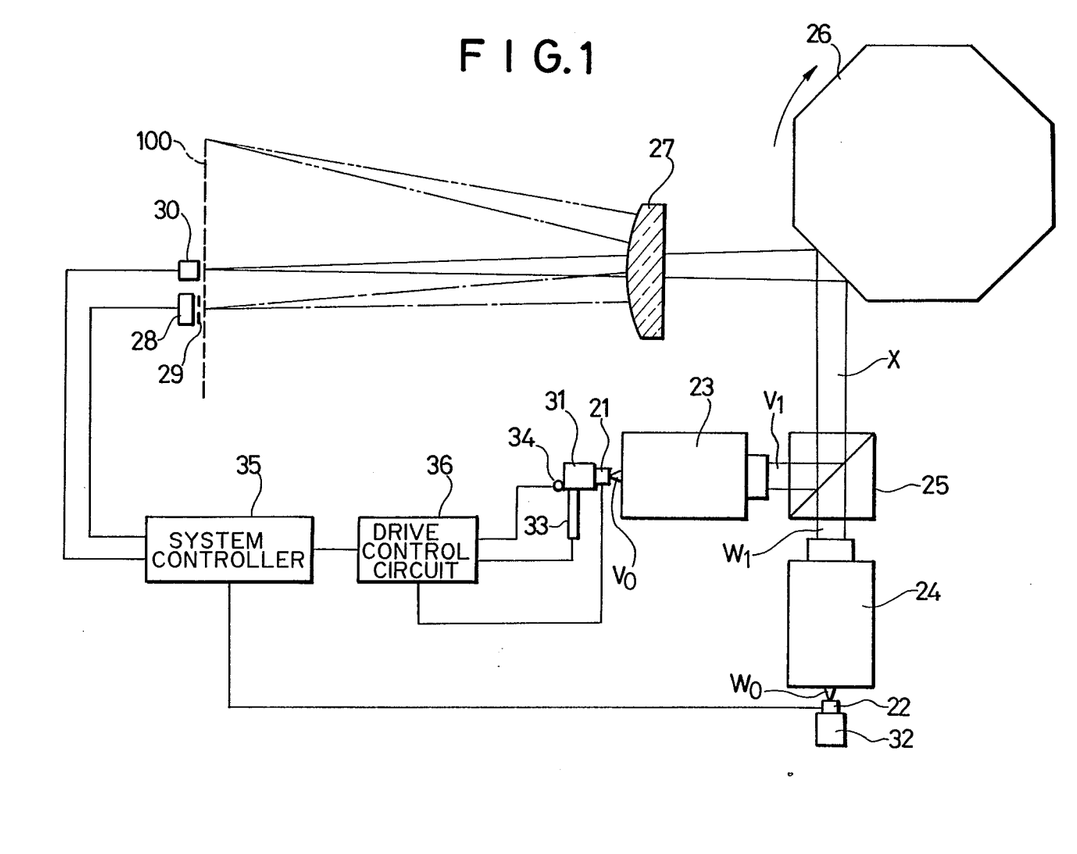
FIG. 1 is a schematic arrangement diagram showing a first embodiment using a composite laser beam forming apparatus according to the present invention.

There are provided two, first and second, semiconductor laser oscillators 21, 22 having different oscillating wavelengths from each other and it is arranged such that a color image is formed with these laser beams.

First and second laser beams $V_0$, $W_0$ with a divergent angle radiated from the first and second laser oscillators 21, 22, respectively, are adapted to be collimated, by means of collimator lenses 23, 24 disposed ahead, into first and second parallel beams $V_1$, $W_1$, respectively.

Further ahead of the first laser oscillator 21, there is disposed a combining dichroic prism 25 having a reflecting angle of 90° to reflect the first parallel beam $V_1$ and for transmitting the second parallel beam $W_1$ thereby combining these beams.

Thus, these parallel beams $V_1$, $W_1$ are combined by the combining dichroic prism 25 into a composite beam X.

The thus formed composite beam X is deflected by a polygon mirror 26 horizontally through a predetermined scanning angle. The composite beam X is passed through a lens 27 so as to irradiate the surface of a photosensitive medium 100 as a member to be irradiated and scan the surface of the medium 100 accordingly as the polygon mirror 26 rotates.

Behind the medium 100, there is disposed a line sensor 30 having a large number of sensor elements arranged in the direction perpendicular to the surface of the paper, and at the side of the line sensor 30 in the direction of the line scanning, there is disposed a rectangular slit 29, and behind the rectangular slit 29, there is disposed a photosensor device 28. The rectangular slit 29 is elongated in the direction perpendicular to the scanning direction by means of the polygon mirror 26.

The first and second laser oscillators 21, 22 are fixed to mount members 31, 32, respectively, and the mount member 31 is provided with a piezoelectric device 33 for shifting itself in the direction of a X axis and a piezoelectric device 34 for shifting itself in the direction of a Y axis.

A drive control circuit 36 for driving these piezoelectric devices 33, 34 is connected with a system controller 35, and the system controller 35 controls the drive circuit 36 depending on information from the line sensor 30 and the photosensor device 28. The drive circuit 36 drives the piezoelectric device 33 and the piezoelectric device 34 and also controls turning on and off of the first and the second laser oscillators 21, 22 according to image data to be recorded.

Figure 2:
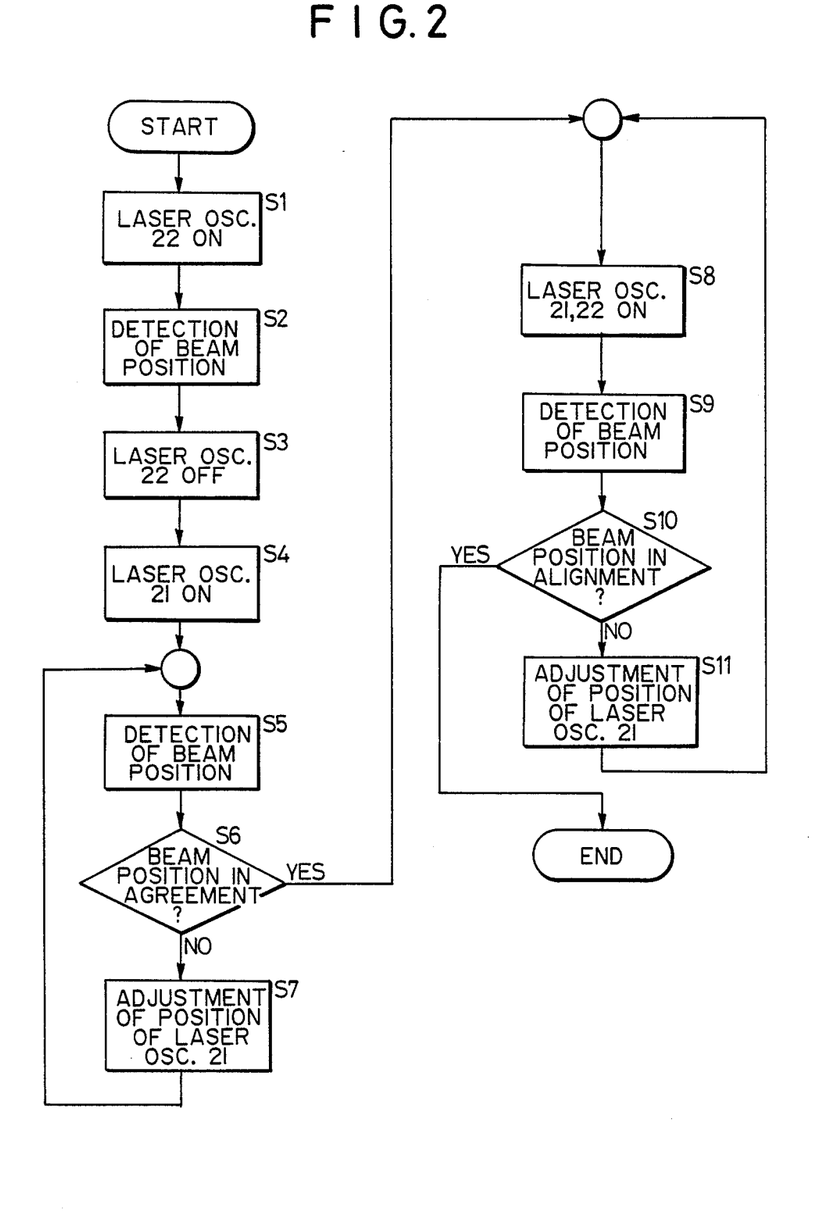
FIG. 2 is a flow chart for explaining operation of the apparatus shown in FIG. 1.

Controlling operations for combining the laser beams in the laser printer with the above structure will be described below with reference to a flow chart of FIG. 2.

First, in order to make an adjustment of the position of the beam in the direction perpendicular to the scanning direction using the line sensor 30, the second laser oscillator 22 is turned on (S1). At this time, the first laser oscillator 21 is turned off. Consequently, the beam $W_1$ from the second laser oscillator 22 is deflected in the scanning direction by the polygon mirror 26 and passed through the lens 27 so as to irradiate the line sensor 30, when there is of course no medium present in its place. At the instant the beam passes on the line sensor 30, the position of the beem in the direction perpendicular to the paper is read (S2).

Thereafter, the second laser oscillator 22 is turned off (S3) and the first laser oscillator 21 is turned on (S4) controlled by the drive control circuit 36. Then, the position of the beam $V_1$ from the first laser oscillator 21 at the instant it passes on the line sensor 30 is read (S5).

Then, the information on the position of the first laser oscillator 21 is compared with the information on the position of the second laser oscillator 22 that has already been read (S6), and if these are not in agreement, the system controller 35 drives, through the drive control circuit 36, the piezoelectric device 34 by one predetermined step in the direction to decrease the discrepancy between the positions, whereby the first laser oscillator 21 is shifted (S7).

The check for deviation is carried out again. That is, the steps S5, S6, S7 are repeated to drive the piezoelectric device 34 until the discrepancy between positions disappear and thereby the first laser oscillator 21 is adjusted to its right position.

After both positions have been brought into agreement, following steps, detection of discrepancy between positions in the scanning direction and adjustment for eliminating it, are taken. That is, both the first and the second laser oscillators 21, 22 are turned on (S8) and the beams passing through the rectangular slits 29 are detected with the photosensor device 28 (S9). At this time, the output waveform of the photosensor device 28 has two peaks as shown in FIG. 3 when the two beams from the first and the second laser oscillators 21, 22 are completely separated from each other in the scanning direction, it has two peaks and a superposed portion therebetween due to their overlapping as shown in FIG. 4 when both the beams are overlapped and not completely aligned with each other, or it has one peak as shown in FIG. 5 when the beams are completely in alignment.

Figure 3:
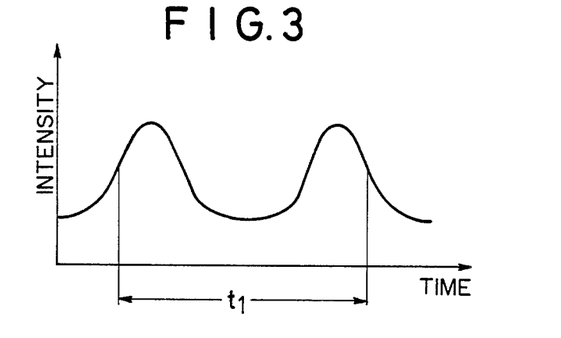
FIG. 3 to FIG. 5 are waveform charts for explaining operation of the apparatus shown in FIG. 1.
Figure 4:
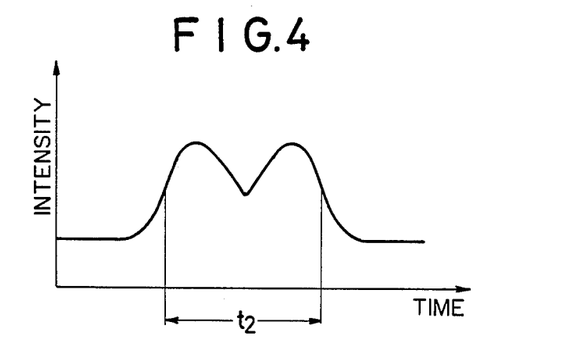
Figure 5:
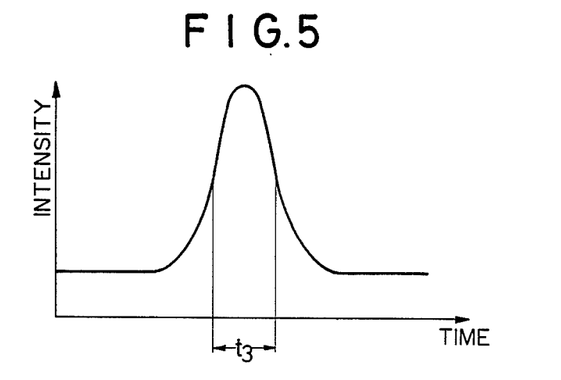

In order to discriminate among such varying waveforms shown in FIG. 3 to FIG. 5, the points at the half the maximum value of the output obtained by the photosensor device 28, varying according to the degree of out of alignment, are detected and the interval of time between the time point at which the half-value point is detected first and the time point at which the half-value point is detected last (interval of time $t_1$, $t_2$, or $t_3$ in FIG. 3 to FIG. 5) is measured. Both the beams are determined to be in alignment when the interval of time is in its minimum (S10).

When two beams are not completely in alignment, the interval of time $t_1$ or $t_2$ becomes large as shown in FIG. 3 or FIG. 4, and thereby, the beams are determined to be in nonalignment. Hence, the system controller 35 drives, through the drive circuit 36, the piezoelectric device 33 by one predetermined step in the direction to decrease the discrepancy between the positions, whereby the first laser oscillator 21 is shifted (S11).

The check for deviation is carried out again. That is, the steps S8, S9, S10, S11 are repeated to drive the piezoelectric device 33 until the discrepancy between positions disappears and the first laser oscillator 21 is adjusted to its right position.

Thus, a composite beam X in which the output beams of the first and the second laser oscillators 21, 22 which are combined in complete alignment can be obtained.

Now a second embodiment of the present invention will be described using FIG. 6 and FIG. 7. The present embodiment is such that it has applied a composite laser beam forming apparatus according to the present invention to a color laser printer having three laser beam sources.

Namely, in the present arrangement, there are provided three, first to third, semiconductor laser oscillators 41, 42, 43 having different oscillating wavelengths from one another and it is arranged such that laser beams from these oscillators form an image of three primary colors (yellow, magenta, and cyan) corresponding to the additive primary colors.

First and third laser beams $L_0$, $N_0$ with a divergent angle radiated from the first and the third laser oscillators 41, 43 are arranged to be combined by means of a combining dichroic prism 44 disposed ahead and the thus combined beam is arranged to be combined further with a second laser beam $M_0$ from the second laser oscillator 42 by means of a combining dichroic prism 45 disposed in front.

In the described manner, the first to the third laser beams $L_0$, $M_0$, $N_0$ radiated from the laser oscillators 41, 42, 43 are designed to be combined into a combined beam O. The combined beam O is turned into a parallel beam $O_0$ by means of a collimator lens 46 disposed ahead.

The thus formed combined beam $O_0$ is separated by a separating prism 47 disposed ahead of the collimator lens 46 into a beam $O_1$ for image formation and a beam $O_2$ for deviation detection.

The image forming beam $O_1$ thrown from the separating prism 47 is adapted to make a scan by means of a polygon mirror 48 in the same manner as described in the first embodiment.

On the other hand, the beam $O_2$ for deviation detection thrown from the separating prism 47 is adapted to pass through a lens 49 and form an image on an area sensor 50 having a large number of sensor elements arranged in a matrix.

The first laser oscillator 41 is fixed to a mount member 51 and the second laser oscillator 42 is fixed to a mount member 52, and this mount member 52 is provided with a piezoelectric device 53 for driving the mount member 52 itself in the direction of a X axis and a piezoelectric device 54 for driving it in the direction of a Y axis. The third laser oscillator 43 is fixed to a mount member 55, and this mount member 55 is provided with a piezoelectric device 56 for driving the mount member 55 itself in the direction of a X axis and a piezoelectric device 57 for driving it in the direction of a Y axis.

Further, a drive control circuit 59 for driving these piezoelectric devices 53, 54, 56, 57 is connected with a system controller 58 and the system controller 58 controls a drive control circuit 59 based on output information from the area sensor 50. The drive control circuit 59 drives the piezoelectric devices 53, 54 and the piezoelectric devices 56, 57 and also controls turning on and off of the first to the third laser oscillators 41, 42, 43.

Figure 7:
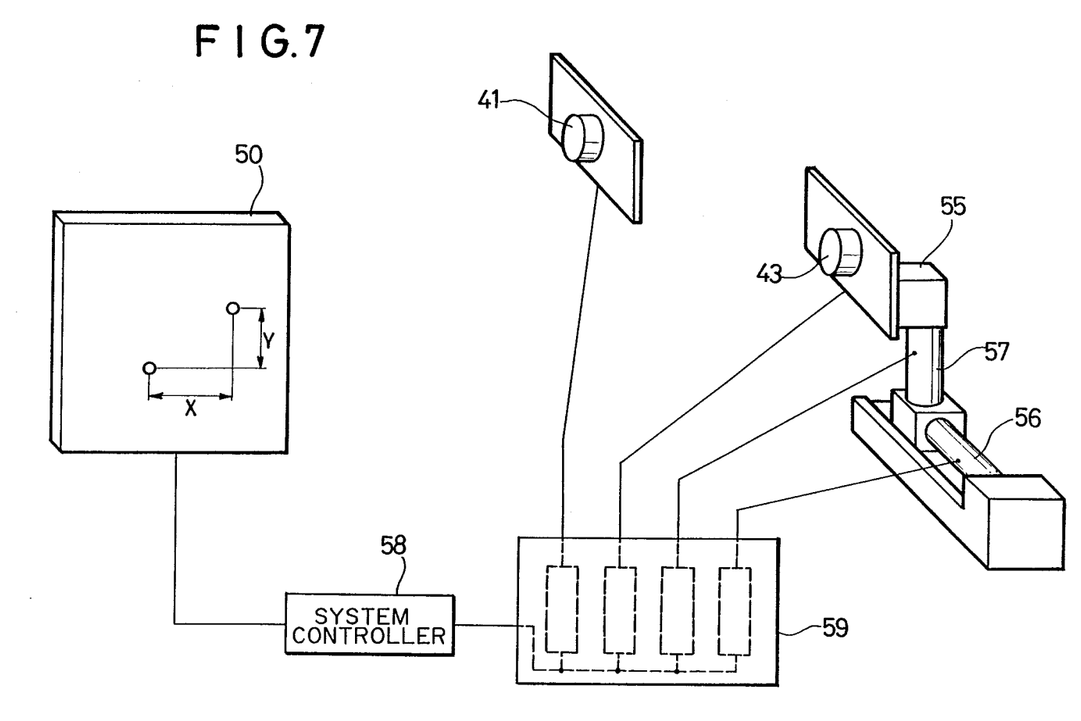
FIG. 7 is a perspective view showing the main parts of the apparatus shown in FIG. 6.

FIG. 7 is a perspective view showing extracted portions incident to the first laser oscillator 41 and the third laser oscillator 43.

In the laser printer of the described arrangement, to align the optical axes in the direction perpendicular to the scanning direction using the area sensor 50, the first laser oscillator 41 is turned on. At this time, both the second and the third laser oscillators 42, 43 are turned off. Thus the beam from the first laser oscillator 41 is thrown on the area sensor 50 and coordinates of the position of the beam in the directions of Y axis and X axis are read by the system controller 58.

Thereafter, the first laser oscillator 41 is turned off by the drive control circuit 59 and simultaneously the third laser oscillator 43 is turned on. Then, coordinates of the position of the beam from the third laser oscillator 43 on the area sensor 50 in the directions of the Y axis and the X axis are read by the system controller 58.

Then, the information on the position of the third laser oscillator 43 is compared with the information on the position of the first laser oscillator 41, and when both the positions are not in agreement, the piezoelectric devices 56 or 57 is driven in the direction to decrease the discrepancy between the positions so that the third laser oscillator 43 is shifted accordingly.

After both the positions are brought into agreement, the following steps for detection of deviation from the right position of the beem output from the second laser oscillator 42 and adjustment for correcting the discrepancy are taken. Also in this time, the adjustment is carried out with reference to the position of the first laser oscillator 41.

When the above described adjustments have been completed, the optical axes of all the first to the third laser oscillators 41, 42, and 43 are brought into complete alignment and a desired composite beam $O_1$ is obtained.

The composite laser beam forming apparatus according to the present invention is not limited to the above described embodiments, but various changes can of course be made without departing from the spirit and scope of the invention.

Figure 6:
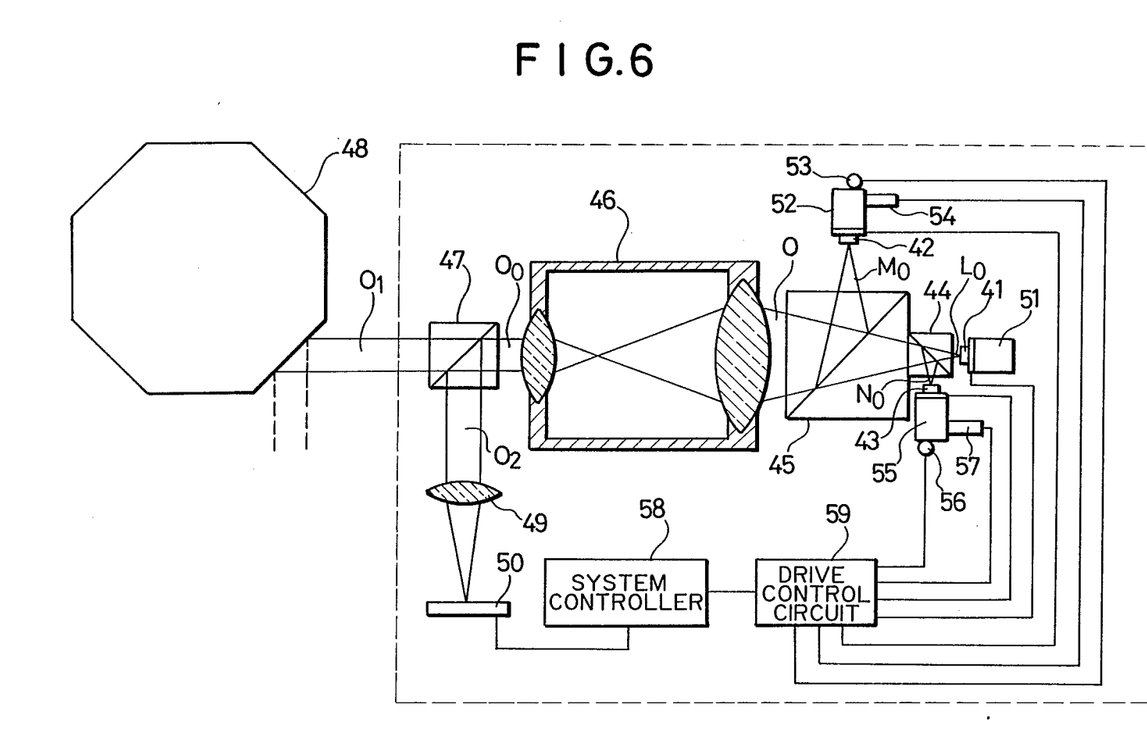
FIG. 6 is a schematic arrangement diagram showing a second embodiment using a composite laser beam forming apparatus according to the present invention.

For instance, the optical apparatus to which the composite laser beam forming apparatus can be applied is not limited to that shown in FIG. 1, FIG. 6, or FIG. 8, but it can be any apparatus in which laser beams are combined in any manner.

In combining laser beams, the number of beams to be combined are quite optional only if it is two or more and the selection of the oscillating wavelengths of the laser beams and setting the outputs can be freely designed.

Further, the beam detector to be disposed at the reference position corresponding to the scanning with the composite beam may be in the vicinity of the scanning surface as shown in the first embodiment, may be just a little ahead of the collimator lens as shown in the second embodiment, or may be any other position where, at least, the plurality of laser beams are combined.

As apparent from the description given above, according to the composite laser beam forming apparatus of the present invention, even if there have occurred variations in the characteristics or position of the optical members with the passage of time or change in temperature, the adjustment of the apparatus is performed following the steps of detecting, with the use of the beam detector, the position of each beam relative to the reference position corresponding to the scanning with the composite beam and activating, according to the result of the detection, the drive members attached to some plural oscillators of all the plural laser oscillators so that the plural laser oscillators are shifted. Thus, the adjustment can be carried out by an ordinary user without requiring any high skill end without the need for having expensive measurement instruments provided, and thereby maintenance is minimized and reliability on the apparatus is enhanced.

What is claimed is:

1. An apparatus for forming a composite laser beam for use in an image forming system which forms an image by scanning a recording medium with a composite laser beam, said apparatus comprising:
   a plurality of laser beam radiation means each radiating a laser beam, respectively;
   beam combining means for combining the plurality of laser beams radiated from said plurality of laser beam radiating means into a single composite beam;
   beam position detecting means for receiving the composite laser beam and for generating information which represents a relative position of the laser beams in the composite laser beam; and
   position adjusting means for adjusting the position of each of the laser radiating means in response to said information generated from said beam position detecting means.

2. An apparatus for forming a composite laser beam according to claim 1, wherein said laser beam radiating means are semiconductor laser devices.

3. An apparatus for forming a composite laser beam according to claim 1, wherein said laser beam radiating means includes moving means capable of moving said laser beam, radiating means on a plane perpendicular to the beam radiating direction.

4. An apparatus for forming a composite laser beam according to claim 2, wherein said beam combining means includes a plurality of collimator lenses for collimating laser beams radiated from said semiconductor lasers and optical members for combining the collimated laser beams.

5. An apparatus for forming a composite laser beam according to claim 2, wherein said beam combining means includes optical members for combining laser beams radiated from said semiconductor lasers and a collimator lens for collimating the combined laser beam.

6. An apparatus for forming a composite laser beam according to claim 1, wherein said beam position detecting means includes a line sensor having a large number of sensor elements arranged in a line and said line sensor outputs a signal indicating the position on which a laser beam has impinged.

7. An apparatus for forming a composite laser beam according to claim 1, wherein said beam position detecting means includes a shielding plate with a slit extending in the direction perpendicular to the main scanning direction of the laser beam and a sensor for receiving a laser beam passing through the slit and outputting a signal corresponding to intensity of the beam.

8. An apparatus for forming a composite laser beam according to claim 1, wherein said beam position detecting means includes an area sensor having a large number of sensor elements arranged in a matrix and said area sensor outputs a signal indicating the position on which a laser beam has impinged.

9. In an improved laser printer having a composite laser beam capable of providing a color image, the improvement comprising:
  a plurality of laser beam sources providing, respectively, different wavelengths of light beams;
  first means for directing the light beams to a recording surface as a unitary light beam;
  second means for detecting the unitary light beam to a sensor to determine the relative position of each different wavelength of light in the unitary light beam; and
  alignment means for adjusting the position of each light beam in response to the output of said sensor so that the light beams are accurately combined into the unitary light beam.

10. The laser printer of claim 9 wherein the second means for directing includes an optical member for directing the light beams to a sensor positioned apart from the recording surface.

11. The laser printer of claim 9 wherein the second means for detecting to determine the relative positions of each light beam includes means for determining the minimum time period between the half value position of the maximum output of the sensor.

12. An apparatus for forming a composite laser beam for use in an image forming apparatus which forms an image by scanning a recording medium with a composite laser beam, comprising:
  first and second laser beam sources radiating first and second laser beams, respectively;
  beam combining means for combining the first and second laser beams into a single composite beam;
  detecting means for detecting the positions of the first and second laser beams within the composite beam;
  comparing means for comparing the detected position of the first laser beam with that of the second laser beam to obtain a deviation therebetween; and
  position adjusting means for adjusting an alignment of the first and second laser beam sources to reduce the deviation obtained by said comparing means.

13. An image forming apparatus comprising:
  first and second laser beam sources radiating first and second laser beams, respectively;
  beam combining means for combining the first and second laser beams into a single composite beam;
  scanning means for scanning the recording medium with the composite beam in a scanning direction;
  a line sensor having a plurality of elements arranged in a direction perpendicular to the scanning direction for detecting a deviation between the first and second beams in the composite beam in a direction perpendicular to the scanning direction;
  a photosensor device having a slit which is elongated in a direction perpendicular to the scanning direction for detecting a deviation between the first and second beams in the composite beam in the scanning direction; and
  position adjusting means for adjusting the alignment of the first and second laser beam sources to reduce the deviations between the first and second beams in the composite beam.

14. A method of forming a composite laser beam by combining first and second laser beams in an image forming apparatus which forms an image by scanning a recording medium with the composite laser beam in a scanning direction, the method comprising the steps of:
  detecting a deviation between the first and second laser beams in the composite laser beam in a direction perpendicular to the scanning direction;
  adjusting the alignment of the first and second laser beams to reduce the deviation in a direction perpendicular to the scanning direction;
  detecting a deviation between the first and second laser beams in the composite laser beam in the scanning direction after the adjustment in the direction perpendicular to the scanning direction; and
  adjusting the alignment of the first and second laser beams to reduce the deviation between them in the scanning direction.

* * * * *